United States Patent [19]

Hanlon et al.

[11] 4,148,748

[45] Apr. 10, 1979

[54] NONREVERSIBLE FREEZE-THAW INDICATOR

[75] Inventors: Robert G. Hanlon, Indianapolis; Joe A. Craig, Speedway, both of Ind.; Leigh B. Bangs, Midland, Mich.

[73] Assignee: The Dow Chemical Company, Midland, Mich.

[21] Appl. No.: 771,049

[22] Filed: Feb. 22, 1977

Related U.S. Application Data

[63] Continuation-in-part of Ser. No. 737,886, Nov. 2, 1976, abandoned.

[51] Int. Cl.² ................................................ C09K 3/00
[52] U.S. Cl. ...................................... 252/408; 73/356; 116/216
[58] Field of Search .................... 252/408; 116/114 V, 116/114.5; 23/230 R; 73/356

[56] References Cited

U.S. PATENT DOCUMENTS

| 3,122,921 | 3/1964  | Koch ........................... 252/408   |
| 3,414,415 | 12/1968 | Broad .......................... 116/114.5 |
| 3,521,489 | 7/1970  | Finkelstein .................... 252/408   |
| 3,577,352 | 5/1971  | Kelkheim ....................... 252/408   |
| 3,980,581 | 9/1976  | Godsey ......................... 252/408   |
| 3,981,683 | 9/1976  | Larson et al. .................. 116/114 V X |
| 4,022,149 | 5/1977  | Berger .......................... 116/114.5 |
| 4,028,944 | 6/1977  | Erb ............................. 73/358    |
| 4,051,804 | 10/1977 | Garnett ......................... 116/114.5 |
| 4,064,828 | 12/1977 | Clark ........................... 116/114.5 |

Primary Examiner—Benjamin R. Padgett
Assistant Examiner—J. L. Barr

[57] ABSTRACT

A nonreversible freeze-thaw indicator which will detect whether an article has been subjected to freezing or thawing conditions comprising an encapsulated translucent to opaque colloidal dispersion of organic solid particles suspended in a liquid medium, said colloidal dispersion having the property of becoming nonreversibly destablized upon freezing which thereafter provides a telltale visual sign if said dispersion rises through its freeze-thaw temperature. After the colloidal dispersion has once been frozen to trigger its irreversible destabilization and is again thawed, it coagulates to form a nonflowing waxy gel, flocculates and precipitates leaving a clear liquid and a coagulated solids layer or partially flocculates to transform a translucent dispersion to a substantially opaque dispersion.

12 Claims, 2 Drawing Figures

NONREVERSIBLE FREEZE-THAW INDICATOR

CROSS REFERENCE TO RELATED APPLICATION

This is a continuation-in-part of application Ser. No. 737,886 filed Nov. 2, 1976 now abandoned.

BACKGROUND OF THE INVENTION (1) Field of the Invention

This invention relates to a nonreversible freeze-thaw indicator which will detect whether an article has been subjected to freezing or thawing conditions, with particular reference to an encapsulated translucent to opaque colloidal dispersion of organic solid particles in a liquid medium which becomes nonreversibly destabilized upon freezing and which thereafter provides a telltale visual sign if the dispersion rises through its freeze-thaw temperature.

(2) Description of the Prior Art

Many products, when subjected to freezing or thawing conditions, deteriorate rapidly to the point where they are seriously affected by loss of quality or are rendered totally unusable. For example, foods such as mayonnaise, fabric softeners, latex products such as paints, concrete modifiers, laboratory supplies, biological samples such as whole blood and the like can be seriously affected or lost when subjected to freezing conditions. In addition, products which need to be kept well frozen such as meats, vegetables, ice cream and the like can lose flavor and texture or even spoil if they are not maintained in a frozen condition. Often, the adverse effects of freezing or thawing conditions on such products cannot be later detected by the appearance of the products. Therefore, it is important to both the seller and buyer of such products that some indicator means be provided which will signal a change in products caused by freezing or thawing conditions.

In the past, many temperature indicators have been proposed, but none to our knowledge have been found to be completely satisfactory or commercially acceptable. Generally the prior art detectors have been characterized by their cumbersome size or intricate construction and have tended to be unreliable and inaccurate. In addition, they generally have poor stability and shelf life at normal storage temperatures.

One known prior art thermosensitive indicator is illustrated by U.S. Pat. No. 2,971,852. This indicator utilizes an emulsion of oil in water, water in oil or oil in oil to record if a temperature rise above its freezing point has occurred since the emulsion will break and separate into two phases after it has thawed. The emulsion indicator differs from the present invention not only in that it utilizes an emulsion rather than the colloidal dispersion or organic solid particles in a liquid media, but also in that it can only be reliably used as a thaw indicator since emulsions are generally unstable in the liquid state at normal storage temperatures and will quickly separate into two phases. Therefore, the emulsion indicator has only a short shelf life above freezing temperatures after being made and must be quickly transformed to its frozen state and used as a thaw indicator to be accurate and reliable.

Accordingly, it is an object of the present invention to provide an improved nonreversible freeze-thaw indicator adapted to detect whether an article has been subjected to freezing or thawing conditions. Another object of the present invention is to provide an indicator that can be easily and economically produced and stored for an indefinite period of time at normal or elevated temperatures without loss of effectiveness. A further object of the present invention is to provide an indicator which can be easily utilized and is reliable and accurate. Other objects of the present invention will be apparent from the following specification, drawings and claims.

SUMMARY

In general, the present invention provides a nonreversible freeze-thaw indicator which will detect whether an article has been subjected to freezing or thawing conditions comprising an encapsulated translucent to opaque colloidal dispersion of organic solid particles suspended in a liquid medium. The colloidal dispersion has the property of becoming nonreversibly destabilized upon freezing which thereafter provides a telltale visual sign if the dispersion rises through its freeze-thaw temperature. After the colloidal dispersion has once been frozen to trigger its nonreversible destabilization and has been thawed, it coagulates to form a non-flowing waxy gel, flocculates and precipitates leaving a clear liquid and a coagulated organic solids layer or partially flocculates to transform a translucent dispersion to a substantially opaque dispersion. The colloidal dispersion is characterized in that the organic solid particles contain insufficient hydrophilic groups to impart inherent colloidal stability in the dispersion. In addition, the dispersion contains insufficient stabilizers such as soaps or other emulsifiers which would prevent its nonreversible destabilization upon freezing.

It has been found that the colloidal dispersion used in the present invention can be formed from organic solid particles of a polymeric resinous material. Beneficially, polymeric resinous materials which form latexes useful in the present invention are styrene polymers, styrene/butadiene copolymers, styrene/acrylic acid copolymers, vinyltoluene/tertiarybutyl styrene copolymers, vinylidene chloride/vinyl chloride copolymers, mixtures thereof and the like. In addition, dyes such a methylene blue may be added to the colloidal dispersion to enhance visibility of the organic solid particles and nucleating agents such as silver iodide crystals may be added to minimize super cooling of the colloidal dispersion. Also bactericides and additives to increase or decrease the freezing point may be incorporated in the colloidal dispersion. It has been found that in order to insure a reliable nonreversible destabilization of the colloidal dispersion upon freeze, the organic solid particles should have a diameter of about 0.7 micron or less and the dispersion should have from about 0.1 to about 50 weight percent of the organic solid particles.

The encapsulation of the colloidal dispersion can be accomplished by placing it in a glass vial, blister pack such as commonly used to package individual pharmaceutical tablets, or other like containers. In use, the freeze-thaw indicator is best placed firmly against the product being monitored inside its shipping container, if possible. In this way, the indicator will not freeze or thaw until just before the product itself starts to freeze or thaw since the product will act as a thermal sink for the indicator. Thus, some fairly massive products may withstand freezing or thawing environments for longer periods of time and the indicator will not show a changing condition until the product itself is about to freeze or thaw.

BRIEF DESCRIPTION OF THE DRAWINGS

The preferred embodiments of the present invention are shown in the accompanying drawings where like characters of reference designate corresponding materials and parts throughout the several views thereof in which.

DESCRIPTION OF THE PREFERRED EMBODIMENTS

The following description illustrates the manner in which the principles of the invention are applied but are not to be construed as limiting the scope of the invention.

Figure 1:
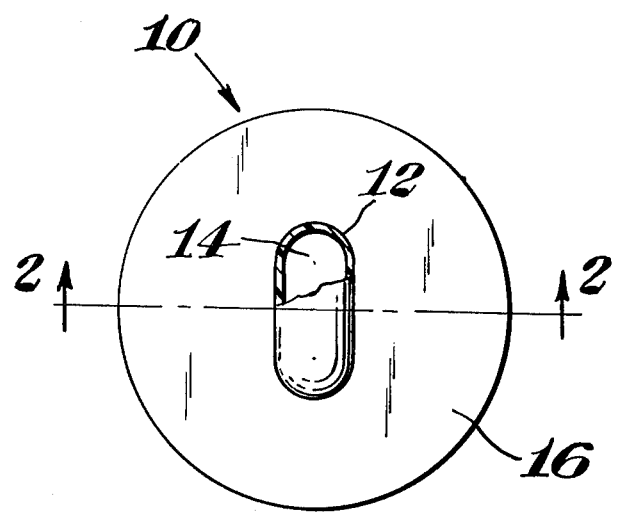
FIG. 1 is a partially cut-away plan view of a nonreversible freeze-thaw indicator which is formed in accordance with the present invention.
Figure 2:
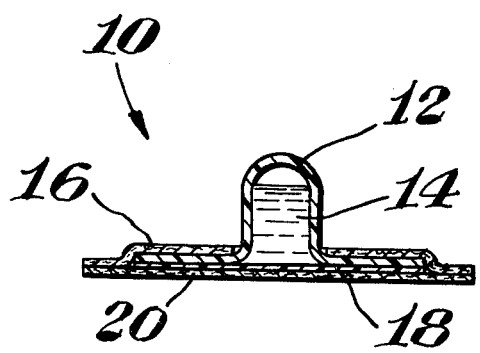
FIG. 2 is a cross-sectional view taken along lines 2—2 of FIG. 1.

More specifically referring to FIGS. 1 and 2, a nonreversible freeze-thaw indicator 10 having a thermoplastic transparent blister 12 encapsulating a colloidal dispersion 14 is illustrated. The back of blister 12 is sealed closed by a thermoplastic sheet 18 and mounted between two cardboard discs 16 and 20 which are adhesively secured together. A pressure sensitive adhesive, not shown, may be applied to disc 20 so that indicator 10 can be adhered to an article which is being monitored.

A large number of indicators in the form of blister packs and glass vials were formed utilizing the polymeric resinous material latexes discussed in the above Summary section at various weight concentrations and particle size distributions for test purposes. It was discovered, that if the organic solid particles had a diameter exceeding about 0.7 microns, an unreliable indicator was formed since the latex would not always be irreversibly destabilized upon freezing. It was further discovered that if the organic solid particles had a diameter of about 0.7 microns, preferably about 0.5 microns, or less, and the colloidal dispersion had from about 10 to about 50 weight percent, preferably about 20 to about 50 weight percent, of the organic solid particles, a very reliable freeze indicator was formed in which the colloidal dispersion became irreversible destabilized upon freezing and which thereafter coagulated to form a non-flowing waxy gel when raised above its freezing temperature. Thus, a reliable freeze indicator is provided which exhibits a telltale visual sign that the indicator has been subjected to freezing conditions. Also, it was found that if the organic solid particles had a diameter of about 0.3 microns, preferably about 0.2 microns, or less, and the colloidal dispersion had from about 0.1 to about 10 weight percent, preferably about 1 to 5 weight percent, of the organic solid particles, a reliable indicator was formed which could be utilized to determine either freezing or thawing conditions, since the colloidal dispersion upon freezing to trigger the irreversible destabilization and then thawing flocculated and precipitated leaving a clear liquid and a coagulated organic solids layer. Thus, a reliable thaw indicator, as well as a freeze indicator, is formed since the indicator after being frozen the first time has the visual appearance of a uniform crystalline solid, whereas after is has passed back through a thaw cycle and refrozen, exhibits the two distinct phases of the frozen crystalline liquid and a coagulated organic solids layer. It was further found that if the organic solid particles had a diameter of about 0.1 micron, preferably about 0.05 micron or less, and the translucent colloidal dispersion formed therewith had from about 0.1 to about 10 weight percent, preferably about 0.5 to 2 weight percent, of the organic solid particles, a reliable freeze indicator was formed in which the translucent colloidal dispersion became irreversible destabilized upon freezing and which thereafter partially flocculated to form a substantially opaque dispersion when raised above its freezing temperature. Thus, a reliable freeze indicator is provided wherein the particle size is so small that a translucent dispersion is formed due to the inability of the particles to scatter light which, after freezing to trigger destabilization and rethawing, partially flocculates or agglomerates to form larger particles which scatter light thereby causing the dispersion to become substantially opaque.

It is understood that the scope of this invention is not limited by the means of encapsulating the colloidal dispersion or by the materials used to form the encapsulating container. Thus, while certain representative embodiments and details have been shown for the purpose of illustrating the invention, it will be apparent to those skilled in the art that various changes and modifications can be made therein without departing from the spirit and the scope of the invention.

What is claimed is:

1. A nonreversible freeze indicator adapted to detect whether an article has been subjected to freezing conditions comprising an encapsulated translucent to opaque colloidal dispersion of organic solid particles suspended in a liquid medium, said colloidal dispersion having the property of becoming nonreversibly destabilized upon freezing which thereafter coagulates to form a non-flowing waxy gel when raised above its freezing temperature thereby providing a telltale visual sign that said indicator has been subjected to freezing conditions, said organic solid particles having a diameter of about 0.7 microns or less and said dispersion having from about 10 weight percent to about 50 weight percent of said organic solid particles.

2. The freeze indicator of claim 1 wherein said organic solid particles have a diameter of about 0.5 microns or less and said dispersion has from about 20 weight percent to about 50 weight percent of said organic solid particles.

3. The freeze indicator of claim 1 wherein said organic solid particles are formed from a polymeric resinous material selected from the group consisting of a styrene polymer, styrene/butadiene copolymer, styrene/acrylic acid copolymer, vinyl toluene/tertiarybutylstyrene copolymer, vinylidene chloride/vinyl chloride copolymer or mixtures thereof.

4. The freeze indicator of claim 3 wherein said organic solid particles have a diameter of about 0.5 micron or less and said dispersion has from about 20 weight percent to about 50 weight percent of said organic solid particles.

5. A nonreversible freeze-thaw indicator adapted to detect whether an article has been subjected to freezing or thawing conditions comprising an encapsulated translucent to opaque colloidal dispersion of organic solid particles suspended in a liquid medium, said colloidal dispersion having the property of becoming nonreversibly destabilized upon freezing which thereafter flocculates and precipitates leaving a clear liquid and a coagulated solids layer when raised above its freezing temperature thereby providing a telltale visual sign that said indicator has been subjected to freezing or thawing conditions, said organic solid particles having a diameter of about 0.3 microns or less and said dispersion having from about 0.1 weight percent to about 10 weight percent of said organic solid particles.

6. The freeze-thaw indicator of claim 5 wherein said organic solid particles have a diameter of about 0.2 microns or less and said dispersion has about 5 weight percent or less of said organic solid particles.

7. The freeze-thaw indicator of claim 5 wherein said organic solid particles are formed from a polymeric resinous material selected from the group consisting of a styrene polymer, styrene/butadiene copolymer, styrene/acrylic acid copolymer, vinyl toluene/tertiarybutylstyrene copolymer, vinylidene chloride/vinyl chloride copolymer or mixtures thereof.

8. The freeze-thaw indicator of claim 7 wherein said organic solid particles have a diameter of about 0.2 microns or less and said dispersion has about 1 weight percent to about 5 weight percent of said organic solid particles.

9. A nonreversible freeze indicator adapted to detect whether an article has been subjected to freezing conditions comprising an encapsulated translucent colloidal dispersion of organic solid particles suspended in a liquid medium, said colloidal dispersion having the property of becoming nonreversibly destabilized upon freezing which thereafter partially flocculates to form a substantially opaque dispersion when raised above its freezing temperature thereby providing a telltale visual sign that said indicator has been subjected to freezing conditions, said organic solid particles having a diameter of about 0.1 microns or less and said dispersion having from about 0.1 weight percent to about 10 weight percent of said organic solid particles.

10. The freeze indicator of claim 9 wherein said organic solid particles have a diameter of about 0.05 microns or less and said dispersion has from about 0.5 weight percent to about 2 weight percent of said organic solid particles.

11. The freeze indicator of claim 9 wherein said organic solid particles are formed from a polymeric resinous material selected from the group consisting of a styrene polymer, styrene/butadiene copolymer, styrene/acrylic acid copolymer, vinyl toluene/tertiarybutylstyrene copolymer, vinylidene chloride/vinyl chloride copolymer or mixtures thereof.

12. The freeze indicator of claim 11 wherein said organic solid particles have a diameter of about 0.05 microns or less and said dispersion has from about 0.5 weight percent to about 2 weight percent of said organic solid particles.

* * * * *